G. F. REINHARD.
FRICTION GEARING FOR LATHES.
APPLICATION FILED JAN. 27, 1916.
1,185,000.
Patented May 30, 1916.
3 SHEETS—SHEET 1.
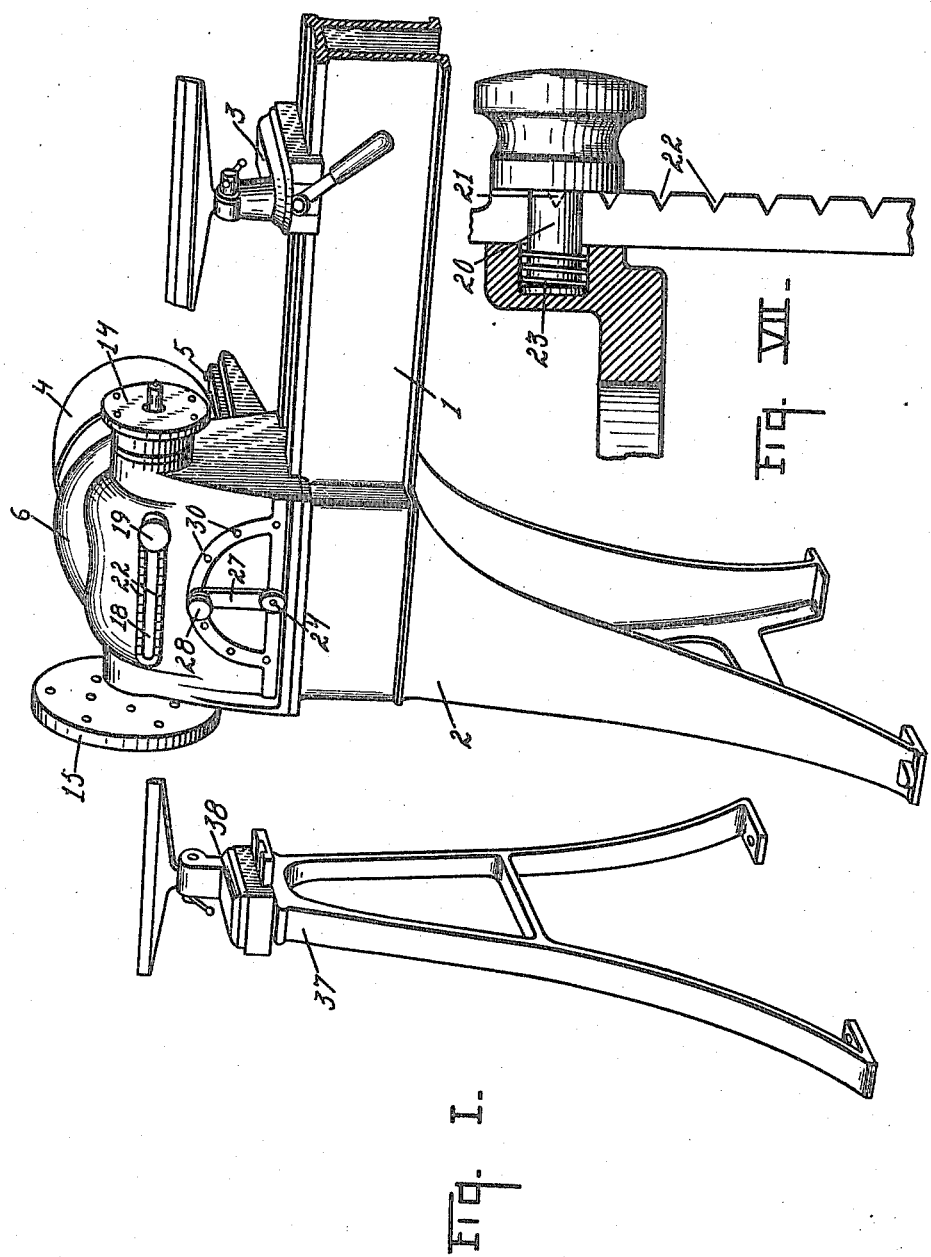
WITNESSES:
Luther Blake
P. W. Pomeroy
INVENTOR.
GEORGE F. REINHARD
BY Chappell & Earl
ATTORNEYS.

G. F. REINHARD.
FRICTION GEARING FOR LATHES.
APPLICATION FILED JAN. 27, 1916.
1,185,000.
Patented May 30, 1916.
3 SHEETS—SHEET 2.
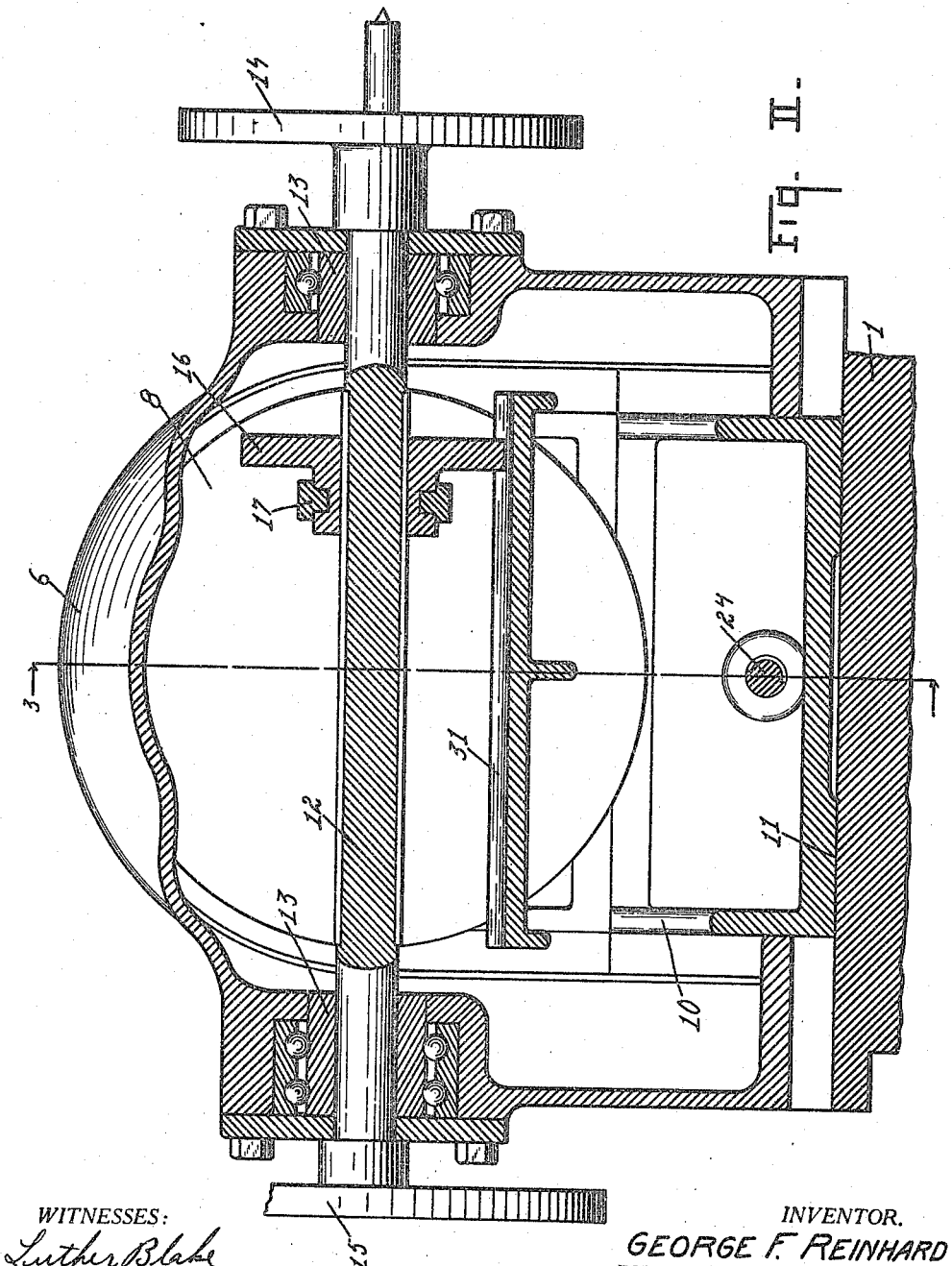
FIG. II.
WITNESSES:
Luther Blake
P. W. Pomeroy
INVENTOR.
GEORGE F. REINHARD
BY Chappell & Earl
ATTORNEYS.

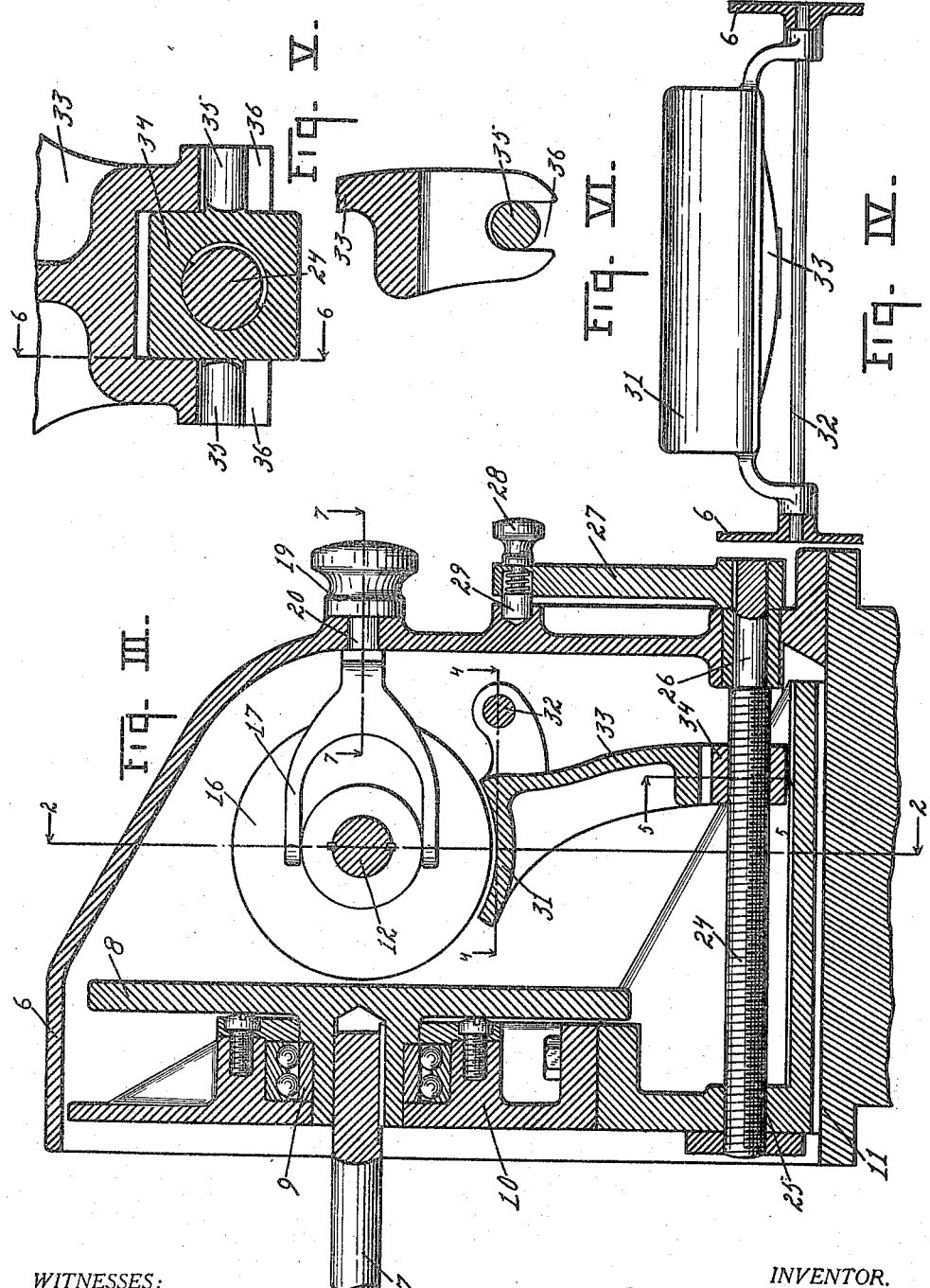

UNITED STATES PATENT OFFICE.

GEORGE F. REINHARD, OF GRAND RAPIDS, MICHIGAN, ASSIGNOR TO GRAND RAPIDS SCHOOL EQUIPMENT CO., OF GRAND RAPIDS, MICHIGAN.

FRICTION-GEARING FOR LATHES.

1,185,000.  Specification of Letters Patent.  Patented May 30, 1916.

Application filed January 27, 1916. Serial No. 74,658.

*To all whom it may concern:*

Be it known that I, GEORGE F. REINHARD, a citizen of the United States, residing at Grand Rapids, county of Kent, State of Michigan, have invented certain new and useful Improvements in Friction-Gearing for Lathes, of which the following is a specification.

This invention relates to improvements in lathe head stocks.

The main objects of my invention are: First, to provide in a lathe an improved friction drive mechanism. Second, to provide in a lathe an improved friction drive mechanism well adapted for the use of inexperienced operators, such as in manual training schools, and the like, in which the mechanism is so arranged that it is not likely to be injured or to cause injury to the operators during adjustment or operation. Third, to provide a structure having these advantages which is simple and compact and durable.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing, forming a part of this specification, in which:

Figure I is a detail perspective view of a lathe embodying the features of my invention. Fig. II is an enlarged detail vertical section on a line corresponding to line 2—2 of Figs. III. Fig. III is a detail vertical section on a line corresponding to line 3—3 of Fig. II. Fig. IV is a detail plan view of the brake shoe and its mounting, partially in section, on a line corresponding to line 4—4 of Fig. III. Fig. V is a detail section on a line corresponding to line 5—5 of Fig. III, showing details of the brake operating means. Fig. VI is a detail section on a line corresponding to line 6—6 of Fig. V. Fig. VII is a detail section on a line corresponding to line 7—7 of Fig. III, showing details of the regulating means.

In the drawing, similar reference characters refer to similar parts throughout the several views, and the sectional views are taken looking in the direction of the little arrows at the ends of the section lines.

Referring to the drawing, 1 represents the bed of a lathe and 2 the supporting pedestal at one end thereof. A tail stock, designated generally by the numeral 3, is adjustably mounted on the bed. As the details of the tail stock form no part of this invention they are not further described herein.

The motor 4 is mounted on a bracket 5 at the rear side of the housing 6. This housing 6 is open on its rear side. On the motor or driving shaft 7 is a driving disk 8. This driving disk is splined to the shaft 7 and mounted in a ball bearing, designated generally by the numeral 9, carried by the bracket 10, slidable on the way 11. See Figs. II and III. The bracket 10 constitutes the rear wall of the housing.

The spindle or driven shaft 12 is supported in ball bearings 13 mounted in the end walls of the housing 6. The shaft 12 is preferably provided with head stock or face plates 14 and 15, there being a head stock plate at each end of the shaft.

The driven disk 16 is splined upon the shaft 12 to coact with the driving disk 8. By shifting the driven disk 16 the speed of the lathe is varied from its maximum to its minimum and also the reverse is secured by shifting across the center of the driving disk. The adjustment of the driven disk 16 is effected by the yoke 17 provided with a finger piece 19, the shank 20 of which is arranged through the slot 18 of the housing 6. The finger piece is provided with detents 21 adapted to coact with a double series of notches 22 in the housing above and below the slot 18, the detents being yieldingly held in engagement with the notches by the spring 23 arranged on the shank. See Fig. VII.

The driving disk 8 is brought into frictional engagement with and disengaged from the driven disk by the adjustment of its supporting bracket 10. This adjustment is effected by means of the screw 24 threaded into the bracket at 25, the screw being journaled in the housing at 26. See Fig. III. The screw is provided with an arm 27 which has a spring pressed finger piece 28 having a detent 29 engaging any of a series of holes 30 in the housing.

The parts in the accompanying drawing are shown in their neutral position, the arm 27 being in a central position, and in this position the driving disk is disengaged from the driven disk and the brake shoe is also disengaged from the driven disk.

The shoe 31 is mounted on the pivot rod 32 and is of such length as to coact with the driven disk throughout its scope of adjustment. This brake shoe is actuated by the screw 24, the brake shoe being provided with an arm 33 projecting downwardly and forked to receive the nut 34 on the screw, the nut having journals 35 at each side engaging slots 36 in the forks of the arm.

With the parts thus arranged it will be seen that when the screw is actuated to engage or disengage the driving disk the brake shoe is engaged and disengaged, the brake being applied when the disk releasing movement of the shoe is continued beyond the neutral point.

With the parts thus arranged the speed of the lathe may be readily varied from its maximum to its minimum and reversed, and the parts are so arranged that the adjustments are easily effected without likelihood of injuring the mechanism or the operator.

The structure is especially designed for use in school or for instruction work so that these features are of special importance.

In Fig. I, I have illustrated a tail stock support 37 for the tail stock 38 adapted to coact with the head stock plate 15 arranged on the outer end of the spindle 12. This enables the handling of work too large to permit its being manipulated over the bed 1.

My improved lathe is simple and compact in structure and is at the same time strong and durable, and, as stated, is well adapted for use of inexperienced persons although it is advantageous for use generally.

I have illustrated and described my improvements in a simple and practical embodiment.

I have not attempted to illustrate or describe certain modifications in structural details which I contemplate as I believe the disclosure made will enable those skilled in the art to which my invention relates to embody or adapt the same as may be desirable.

Having thus described my invention, what I claim as new and desire to secure by Letters Patent, is:

1. In a structure of the class described, the combination of a housing open at its rear side, a driving shaft, a driving disk disposed within said housing and splined upon said driving shaft, a bearing bracket provided with a bearing for said driving disk slidably mounted in said housing, a driven spindle arranged transversely of said driving shaft, a driven disk splined on said spindle, a yoke for shifting said driven disk provided with a finger piece projecting through a slot in said housing and having a detent, a screw journaled in said housing and having threaded connection with said bearing bracket whereby said bracket is shifted to adjust said driving disk, an adjusting arm on said screw provided with a detent for holding it in its adjusted positions, a brake pivotally mounted parallel with said spindle to coact with said driven disk throughout its scope of adjustment, said brake being provided with a forked arm, the forks having slots therein, and a nut on said screw disposed between said forks and provided with journals engaging said slots thereof.

2. In a structure of the class described, the combination of a housing open at its rear side, a driving shaft, a driving disk disposed within said housing and splined upon said driving shaft, a bearing bracket provided with a bearing for said driving disk slidably mounted in said housing, a driven spindle arranged transversely of said driving shaft, a driven disk splined on said spindle, a yoke for shifting said driven disk provided with a finger piece projecting through a slot in said housing and having a detent, a screw journaled in said housing and having threaded connection with said bearing bracket whereby said bracket is shifted to adjust said driving disk, and an adjusting arm on said screw provided with a detent for holding it in its adjusted positions.

3. In a structure of the class described, the combination of a housing, a driving shaft, a driving disk disposed within said housing and splined upon said driving shaft, an adjustably mounted bearing bracket provided with a bearing for said driving disk, a driven spindle arranged transversely of said driving shaft, a driven disk splined on said spindle, means for shifting said driven disk, a screw journaled in said housing and having threaded connection with said bearing bracket whereby said bracket is shifted to adjust said driving disk, and a brake pivotally mounted parallel with said spindle to coact with said driven disk throughout its scope of adjustment, said brake having operative connection with said screw.

4. In a structure of the class described, the combination of a housing, a driving shaft, a driving disk disposed within said housing and splined upon said driving shaft, an adjustably mounted bearing bracket provided with a bearing for said driving disk, a driven spindle arranged transversely of said driving shaft, a driven disk splined on said spindle, means for shifting said driven disk, and a screw journaled in said housing and having threaded connection with said bearing bracket whereby said bracket is shifted to adjust said driving disk.

5. In a structure of the class described, the combination of a housing open at its rear side, a motor mounted at the rear of said housing, a driving shaft, a driving disk disposed within said housing and splined upon said driving shaft, an adjustable bearing bracket constituting a rear wall for said housing provided with a bearing for said driving disk, a driven spindle arranged transversely of said driving shaft, a driven disk splined on said spindle, means for shifting said driven disk, means for shifting said bracket to engage and disengage said driving disk, and a brake pivotally mounted parallel with said spindle to coact with said driven disk throughout its scope of adjustment, said bracket shifting means also constituting means for actuating said brake.

6. In a structure of the class described, the combination of a housing open at its rear side, a motor mounted at the rear of said housing, a driving shaft, a driving disk disposed within said housing and splined upon said driving shaft, an adjustable bearing bracket constituting a rear wall for said housing provided with a bearing for said driving disk, a driven spindle arranged transversely of said driving shaft, a driven disk splined on said spindle, means for shifting said driven disk, and means for shifting said bracket to engage and disengage said driving disk.

7. In a structure of the class described, the combination of a housing, a driving shaft, a driving disk disposed within said housing and splined upon said driving shaft, said driving disk being supported for adjustment, a driven spindle arranged transversely of said driving shaft, a driven disk splined upon said spindle, means for shifting said driven disk, means for shifting said driving disk into and out of engagement with said driven disk comprising a screw, and a brake for said driven disk, said brake being operatively connected to said screw.

8. In a structure of the class described, the combination of a driving shaft, a driving disk mounted for adjustment and splined to said driving shaft, a driven spindle arranged transversely of said driving shaft, a driven disk splined to said spindle, means for shifting said driven disk, a brake for said driven disk, and means for adjusting said driving disk and brake comprising a screw adapted when adjusted to the neutral position to cause disengagement of both the brake and the driving disk from the driven disk, and when rotated in one direction from such neutral position to cause the driving disk to engage the driven disk and when rotated in the opposite direction to cause the brake to engage the driven disk.

9. In a structure of the class described, the combination of a driving shaft, a driving disk mounted for adjustment and splined to said driving shaft, a driven spindle arranged transversely of said driving shaft, a driven disk splined to said spindle, means for shifting said driven disk, a brake for said driven disk, and means for adjusting said driving disk and brake adapted when adjusted to the neutral position to cause disengagement of both the brake and the driving disk from the driven disk, and when adjusted in one direction from such neutral position to cause the driving disk to engage the driven disk and when adjusted in the opposite direction to cause the brake to engage the driven disk.

In witness whereof, I have hereunto set my hand and seal in the presence of two witnesses.

GEORGE F. REINHARD. [L. S.]

Witnesses:
WM. P. PUTNAM,
B. F. SCHMIDT.

Copies of this patent may be obtained for five cents each, by addressing the "Commissioner of Patents, Washington, D. C."